United States Patent
Kim et al.

(10) Patent No.: US 9,325,033 B2
(45) Date of Patent: Apr. 26, 2016

(54) SODIUM-METAL CHLORIDE SECONDARY BATTERY AND METHOD OF MANUFACTURING THE SAME

(71) Applicant: KOREA ELECTRONICS TECHNOLOGY INSTITUTE, Seongnam-si, Gyeonggi-do (KR)

(72) Inventors: Young Jun Kim, Seongnam-si (KR); Goo Jin Jeong, Seongnam-si (KR); Han Su Kim, Seoul (KR)

(73) Assignee: KOREA ELECTRONICS TECHNOLOGY INSTITUTE, Seongnam-Si, Gyeonggi-Do (KR)

(*) Notice: Subject to any disclaimer, the term of this patent is extended or adjusted under 35 U.S.C. 154(b) by 158 days.

(21) Appl. No.: 14/469,909

(22) Filed: Aug. 27, 2014

(65) Prior Publication Data
US 2015/0099195 A1 Apr. 9, 2015

(30) Foreign Application Priority Data
Oct. 8, 2013 (KR) .................. 10-2013-0119667

(51) Int. Cl.
| | |
|---|---|
| *H01M 10/04* | (2006.01) |
| *H01M 10/054* | (2010.01) |
| *H01M 10/0563* | (2010.01) |
| *H01M 4/133* | (2010.01) |
| *H01M 4/38* | (2006.01) |
| *H01M 4/40* | (2006.01) |

(Continued)

(52) U.S. Cl.
CPC ............ *H01M 10/054* (2013.01); *H01M 4/133* (2013.01); *H01M 4/381* (2013.01); *H01M 4/40* (2013.01); *H01M 4/582* (2013.01); *H01M 4/583* (2013.01); *H01M 4/587* (2013.01); *H01M 10/04* (2013.01); *H01M 10/0563* (2013.01); *H01M 2004/028* (2013.01); *H01M 2300/002* (2013.01); *Y10T 29/49108* (2015.01)

(58) Field of Classification Search
None
See application file for complete search history.

(56) References Cited

U.S. PATENT DOCUMENTS

| | | | | |
|---|---|---|---|---|
| 4,352,546 | A | * 10/1982 | Iwata et al. | 396/61 |
| 4,891,281 | A | 1/1990 | Kuo et al. | |
| 5,213,914 | A | * 5/1993 | Heitbaum et al. | 429/346 |

FOREIGN PATENT DOCUMENTS

| | | |
|---|---|---|
| DE | 2140146 A1 | 3/1973 |
| EP | 1363343 A1 * | 11/2003 |

(Continued)

OTHER PUBLICATIONS

J-PlatPat machine translation of JP 07-272753A (Oct. 1995).*

(Continued)

*Primary Examiner* — Gregg Cantelmo
(74) *Attorney, Agent, or Firm* — Hauptman Ham, LLP

(57) ABSTRACT

There are provided a sodium-metal chloride secondary battery and a method of manufacturing the same. A secondary battery that is operated at room temperature and has a more stable electrochemical characteristic is provided. The present invention provides a sodium-metal chloride secondary battery and a method of manufacturing the same. The battery includes an anode made of a sodium-containing inorganic material, an electrolytic solution containing an electrolyte ($NaAlCl_4$) and a solvent (sulfur dioxide), and a cathode including a carbon-based material in which NaCl is generated and decomposed according to an oxidation-reduction reaction of $NaAlCl_4$-$xSO_2$ and a metal chloride ($CuCl_2$).

12 Claims, 6 Drawing Sheets

(51) Int. Cl.
*H01M 4/58* (2010.01)
*H01M 4/587* (2010.01)
*H01M 4/583* (2010.01)
*H01M 4/02* (2006.01)

(56) References Cited

FOREIGN PATENT DOCUMENTS

| | | | |
|---|---|---|---|
| GB | 2124821 A | | 2/1984 |
| JP | 51025230 | | 7/1976 |
| JP | 59049159 | | 3/1984 |
| JP | 07272753 A | * | 10/1995 |
| JP | 2012160437 A | | 8/2012 |
| JP | 2013-054987 A | | 3/2013 |
| KR | 1020130098236 A | | 9/2013 |

OTHER PUBLICATIONS

European Search Report for application No. 14182383.1 dated Feb. 9, 2015.
Korean Office Action for application No. 10-2013-0119667 dated Jan. 21, 2015.
Korean Notice of Allowance for application No. 10-2013-0119667 dated Jul. 31, 2015.
Japanese Office Action for application No. 2014-173242 dated Aug. 31, 2015.

* cited by examiner

SODIUM-METAL CHLORIDE SECONDARY BATTERY AND METHOD OF MANUFACTURING THE SAME

CROSS-REFERENCE TO RELATED APPLICATION

This application claims priority to and the benefit of Korean Patent Application No. 10-2013-0119667 filed in the Korean Intellectual Property Office on Oct. 8, 2013, the entire contents of which are incorporated herein by reference.

TECHNICAL FIELD

The present invention relates to a sodium-based secondary battery, and more specifically, to a sodium-metal chloride secondary battery that is operated at room temperature and has a more stable electrochemical characteristic, and a method of manufacturing the same.

BACKGROUND

Due to digitalization and high performance of electronic products, and the like, the needs of consumers have changed. Therefore, market demand is being changed to the development of batteries that are thin, lightweight, and have a high capacity according to a high energy density. Also, in order to address future energy and environment problems, the development of hybrid electric vehicles, electric vehicles, and fuel cell vehicles are actively progressing, and there is a need for a large-sized battery for vehicle power.

As a small and light battery capable of charging and discharging with a high capacity, a lithium-based secondary battery is available, and is used in portable electronic and communication devices such as a small video camera, a mobile phone, and a notebook. The lithium secondary battery includes a cathode, an anode, and an electrolyte. Lithium ions released from a cathode active material are intercalated into an anode active material during charge and desorbed during discharge. Since the ions switch between both electrodes and deliver energy, charge and discharge are possible.

Meanwhile, recently, research on a sodium-based secondary battery using sodium rather than lithium has been in focus again. Since sodium is an abundant resource, when a secondary battery using sodium rather than lithium is manufactured, it may be possible to manufacture the secondary battery at a low cost.

As described above, although the sodium-based secondary battery is beneficial, sodium metal-based secondary batteries in the related art, for example, NAS (Na—S battery) and ZEBRA (Na—NiCl2 battery), are unable to be used at room temperature. That is, there is a problem of battery safety due to use of liquid sodium and a positive electrode active material at high temperatures, and a degradation in battery performance due to corrosion. Meanwhile, recent research on a lithium ion battery using deintercalation of sodium ions has been actively progressing, but an energy density and lifespan characteristic thereof is still low. Accordingly, a sodium-based secondary battery that is able to be used at room temperature and has an excellent energy density and lifespan characteristic is necessary.

SUMMARY

According to the present invention, there are provided a sodium-metal chloride secondary battery and a method of manufacturing the same. A sodium-based inorganic liquid electrolyte based on sulfur dioxide is used as an ion conductor, and a metal chloride is simultaneously used as an anode material. Therefore, compared to a sodium secondary battery in the related art, the battery is operated at room temperature, has a high energy density and a high power density, and ensures safety, and is cheap.

According to an aspect of the present invention, there is provided a method of manufacturing a sodium-metal chloride secondary battery. The method includes preparing a cathode containing a metal chloride and an anode, and providing an inorganic liquid electrolyte containing sulfur dioxide ($SO_2$) and a sodium salt between the cathode and the anode.

The sodium salt may be at least one of $NaAlCl_4$, $NaGaCl_4$, $Na_2CuCl_4$, $Na_2MnCl_4$, $Na_2CoCl_4$, $Na_2NiCl_4$, $Na_2ZnCl_4$, and $Na_2PdCl_4$.

In the inorganic liquid electrolyte, a molar ratio of $SO_2$ based on the sodium salt may be 0.5 to 10, and preferably, 1.5 to 3.0.

The metal chloride may include at least one of $CuCl_2$, $CuCl$, $NiCl_2$, $FeCl_2$, $FeCl_3$, $CoCl_2$, $MnCl_2$, $CrCl_2$, $CrCl_3$, $VCl_2$, $VCl_3$, $ZnCl_2$, $ZnCl_4$, $NbCl_5$, $MoCl_3$, $MoCl_5$, $RuCl_3$, $RhCl_3$, $PdCl_2$, $AgCl$, and $CdCl_2$.

A content of the metal chloride in the cathode may be 60 to 99 wt %.

The anode may be any of a sodium metal, a sodium-containing alloy, a sodium-containing intermetallic compound, a sodium-containing carbon material, and a sodium-containing inorganic material.

The inorganic material may include at least one of an oxide, a sulfide, a phosphide, a nitride, and a fluoride.

A content of an anode material in the anode may be 60 to 100 wt %.

The cathode may include the carbon material and the metal chloride.

A content of carbon in the cathode may be 60 to 100 wt %.

In the cathode, 0 to 20 at % of at least one other element may be included in the carbon material.

The other element may include nitrogen (N), oxygen (O), boron (B), fluorine (F), phosphorus (P), sulfur (S), or silicon (Si).

The present invention also provides a configuration of a sodium-metal chloride secondary battery manufactured by the above manufacturing method.

The present invention also provides a sodium-metal chloride secondary battery including an anode made of a sodium-containing inorganic material, an electrolytic solution containing an electrolyte ($NaAlCl_4$) and a solvent (sulfur dioxide), and a cathode including a carbon-based material in which $NaCl$ is generated and decomposed according to an oxidation-reduction reaction of $NaAlC_{14}$-$xSO_2$ and metal chloride ($CuCl_2$).

DETAILED DESCRIPTION

Figure 1:
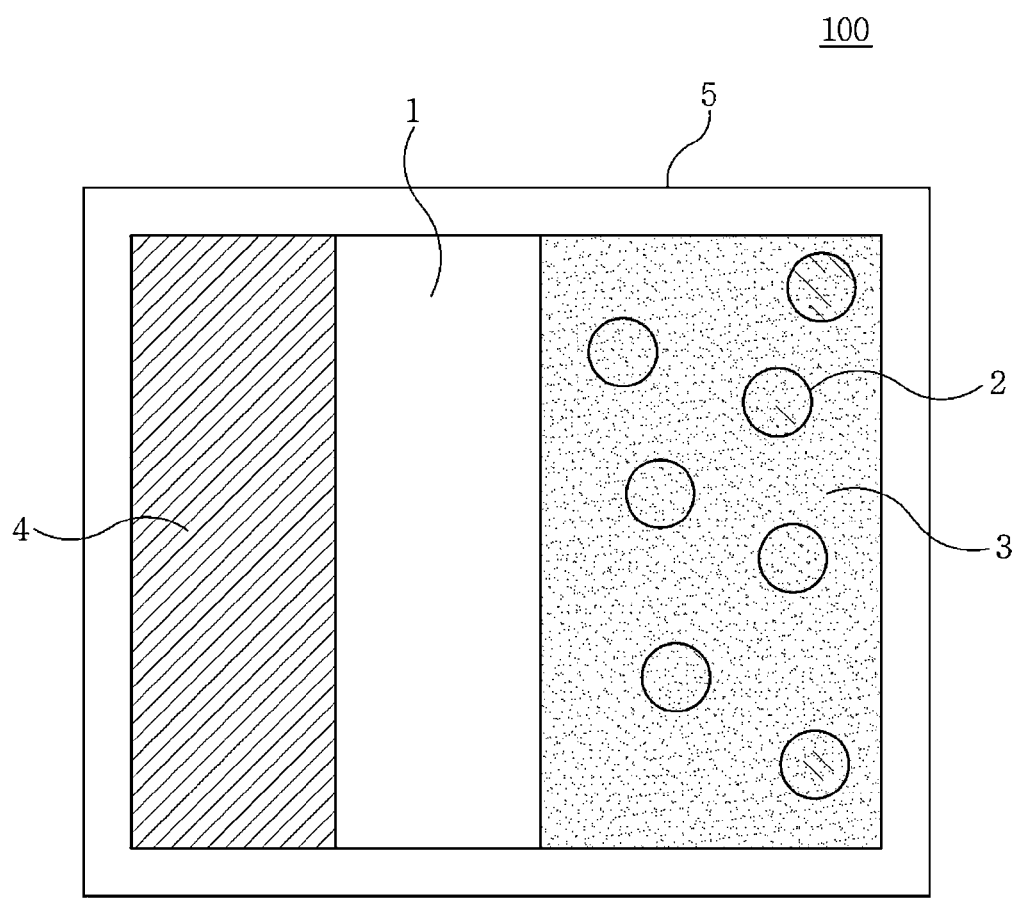
FIG. 1 is a diagram illustrating a sodium-metal chloride secondary battery according to an embodiment of the present invention.

The following descriptions will be made focusing on configurations necessary for understanding operations according to embodiments of the present invention. Therefore, descriptions of other configurations that might obscure the gist of the present invention will be omitted.

Moreover, terms and words used in this specification and claims should not be interpreted as limited to commonly used meanings or meanings in dictionaries and should be interpreted with meanings and concepts which are consistent with the technological scope of the invention based on the principle that the inventors have appropriately defined concepts of terms in order to describe the invention in the best way. Therefore, since the embodiments described in this specification and configurations illustrated in the drawings are only exemplary embodiments and do not represent the overall technological scope of the present invention, it is understood that the present invention covers various equivalents, modifications, and substitutions at the time of filing of this application.

Hereinafter, the embodiments of the present invention will be described in detail with reference to the accompanying diagrams.

FIG. 1 is a diagram schematically illustrating a configuration of a sodium-metal chloride secondary battery 100 according to an embodiment of the present invention.

As illustrated in FIG. 1, the sodium-metal chloride secondary battery 100 of the present invention may include a metal chloride cathode 3 having at least some metal chloride 2, a sodium-containing anode 4, a sulfur dioxide ($SO_2$)-based inorganic liquid electrolyte 1, and a case 5. The sodium-metal chloride secondary battery 100 having these components may be, particularly, a sodium-sulfur dioxide (Na—$SO_2$) secondary battery. The sodium-metal chloride secondary battery 100 of the present invention is implemented to be operated at room temperature based on the metal chloride cathode 3 and the sulfur dioxide-based inorganic liquid electrolyte 1.

The cathode 3 includes a porous carbon material and the metal chloride 2 and provides a space in which an oxidation-reduction reaction of $NaAlCl_{4-x}SO_2$ occurs. The metal chloride 2 included in the cathode 3 may include at least one of $CuCl_2$, $CuCl$, $NiCl_2$, $FeCl_2$, $FeCl_3$, $CoCl_2$, $MnCl_2$, $CrCl_2$, $CrCl_3$, $VCl_2$, $VCl_3$, $ZnCl_2$, $ZnCl_4$, $NbCl_5$, $MoCl_3$, $MoCl_5$, $RuCl_3$, $RhCl_3$, $PdCl_2$, $AgCl$, and $CdCl_2$. In particular, in the present invention, the cathode 3 may include the porous carbon material and a predetermined weight ratio of $CuCl_2$. When charge and discharge are performed on $CuCl_2$, an oxidation number of Cu is changed, a reaction with sodium ions is performed, and discharge products of Cu and NaCl are obtained. When charge is performed, $CuCl_2$ is reversibly regenerated. A content of the metal chloride 2 in the cathode 3 is 50 to 100 wt % or 60 to 99 wt %, and preferably, 70 to 95 wt % when additional elements are mixed in order to increase characteristics of the cathode 3. The carbon material of the cathode 3 includes at least one other element in some cases. The other element may include at least one of nitrogen (N), oxygen (O), boron (B), fluorine (F), phosphorus (P), sulfur (S), or silicon (Si). A content of the other element is 0 to 20 at %, and preferably, 5 to 15 at %. When the content of the other element is less than 5 at %, an increase in a capacity resulting from adding of the other element is insignificant. When the content of the other element is 15 at % or more, electrical conductivity of the carbon material and ease of electrode forming decrease.

The anode 4 uses a sodium metal, a sodium-containing alloy, a sodium-containing intermetallic compound, a sodium-containing carbon material, or a sodium-containing inorganic material. The inorganic material may include at least one of an oxide, a sulfide, a phosphide, a nitride, and a fluoride. A content of the anode material in the anode 4 may be 60 to 100 wt %.

The sulfur dioxide-based inorganic liquid electrolyte 1 used as an electrolyte and an anodic reaction active material includes $NaAlCl_4$ (solute) and $SO_2$ (solvent). In the sulfur dioxide-based inorganic liquid electrolyte 1, a molar ratio of $SO_2$ based on $NaAlCl_4$ is 0.5 to 10, and preferably, 1.5 to 3.0. When a molar ratio of $SO_2$ is less than 1.5, electrolyte ion conductivity decreases, and when the molar ratio of $SO_2$ is greater than 3.0, a vapor pressure of the electrolyte increases. In addition to $NaAlCl_4$ used as the solute, $NaGaCl_4$, $Na_2CuCl_4$, $Na_2MnCl_4$, $Na_2CoCl_4$, $Na_2NiCl_4$, $Na_2ZnCl_4$, $Na_2PdCl_4$, and the like may be used. Among the above various solutes, $NaAlCl_4$ shows a relatively excellent battery characteristic. The sulfur dioxide-based inorganic liquid electrolyte 1 may be prepared by a method of inputting $SO_2$ gas to a mixture of NaCl and $AlCl_3$ (or a salt of $NaAlCl_4$ alone).

The case 5 may be provided to cover components including the cathode 3, the anode 4, and the sulfur dioxide-based inorganic liquid electrolyte 1 interposed therebetween. A signal line connected to the cathode 3 and a signal line connected to the anode 4 may be provided at a side of the case 5. A shape or a size of the case 5 may be determined according to the field to which the sodium-metal chloride secondary battery 100 may be applied. A material of the case 5 may be a non-conductive material. When the cathode 3 and the anode 4 are covered by an insulator, the case 5 may also be made of a conductive material.

Figure 2:
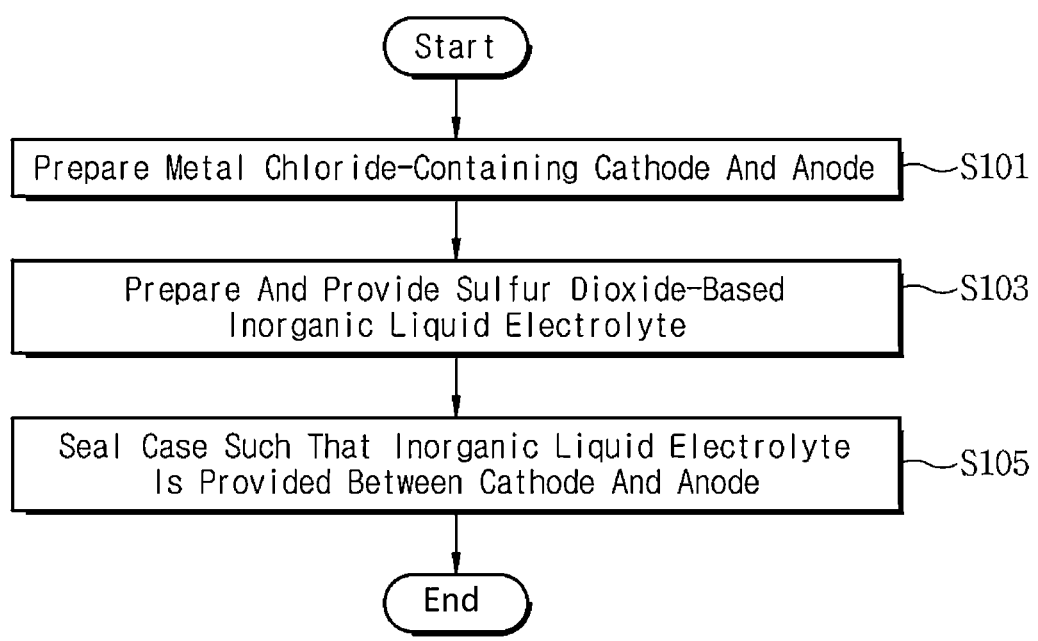
FIG. 2 is a flowchart illustrating a method of manufacturing a sodium-metal chloride secondary battery according to an embodiment of the present invention.

FIG. 2 is a flowchart illustrating a method of manufacturing the sodium-metal chloride secondary battery 100 according to an embodiment of the present invention.

As illustrated in FIG. 2, the method of manufacturing the sodium-metal chloride secondary battery 100 of the present invention may include, an operation (S101) of preparing the cathode 3 containing the metal chloride 2 and the anode 4, an operation (S103) of preparing and providing the sulfur dioxide-based inorganic liquid electrolyte 1, and an operation (S105) of sealing the cathode 3 and the anode 4 having the sulfur dioxide-based inorganic liquid electrolyte 1 interposed therebetween in the case 5 and cutting in a predetermined shape.

In S101, the operation of preparing the cathode 3 may include an operation of preparing a carbon material in which NaCl is generated and decomposed and the metal chloride 2, an operation of stirring the carbon material and the metal chloride 2, and an operation of generating a slurry of the stirred material and preparing the cathode 3 using the same. For example, among carbon materials such as natural graphite, artificial graphite, coke, carbon black, pyrolytic carbon, a carbon fiber, and an organic polymer compound plastic material, a carbon material in which NaCl is generated and decomposed may be prepared. The carbon material may have, for example, any of a thin shape such as natural graphite, a bead shape such as a mesocarbon microbead, a fiber shape such as a graphitized carbon fiber, and an aggregate of fine powder. Here, the carbon material may also serve as a conductive material.

The cathode 3 may include a current collector and a cathode active material layer having a cathode active material and a binding agent formed on a surface of the current collector. As described above, the cathode active material layer includes the cathode active material and the binding agent. When the carbon material is used as the cathode active material, it is possible to suppress a degradation in battery performance. A preferred content of the carbon material of the cathode active material is 60 to 100 wt % based on a mass of the cathode active material layer. The carbon material may include 0 to 20 at % of at least one other element. Here, the other element may include nitrogen (N), oxygen (O), boron (B), fluorine (F), phosphorus (P), sulfur (S), or silicon (Si).

The binding agent to be used is not specifically limited, and binding agents known in the related art may be used. Specifically, polyvinylidene fluoride (hereinafter referred to as PVDF), polytetrafluoroethylene (hereinafter referred to as PTFE), copolymers of tetrafluoroethylene, hexafluoropropylene, and vinylidene fluoride, copolymers of hexafluoropropylene and vinylidene fluoride, copolymers of tetrafluoroethylene and perfluorinated vinyl ether, and the like may be used. These are used alone or in mixtures thereof. Examples of the binding agent may include polysaccharides such as a starch, methyl cellulose, carboxymethyl cellulose, hydroxymethyl cellulose, hydroxyethyl cellulose, hydroxypropylcellulose, carboxymethylhydroxyethyl cellulose, and nitrocellulose, and derivatives thereof. Also, examples of the binding agent may include inorganic minute particles such as colloidal silica. Preferably, a content of the binding agent is 20 to 1 mass % based on a mass of the cathode active material layer, and more preferably, 10 to 1 mass %.

The cathode active material layer may further include other components as necessary in addition to the binding agent and the cathode active material, as long as effects of the present invention are not interfered with. For example, conducting material, a thickener, and an ion conductive polymer may be included. Also, when the ion conductive polymer is included, a polymerization initiator for polymerizing the polymer may be included. Also, a mixing ratio of these components is not specifically limited and may be adjusted by appropriately referring to ratios known for the sodium-based secondary battery.

The current collector is made of a thin, mesh, expanded grid (expanded metal), and punched metal using a conductive material such as nickel, copper, and stainless steel (SUS). Knots of a mesh, a diameter of a line, the number of meshes, and the like are not specifically limited, and may use configurations known in the related art. A size of the current collector is determined according to purposes of use of the battery. When a large electrode used in a large battery is manufactured, a current collector having a large area is used. When a small electrode is manufactured, a current collector having a small area is used.

In S101, in the operation of preparing the anode 4, a sodium metal, a sodium-containing alloy, a sodium-containing intermetallic compound, or a sodium-containing inorganic material may be prepared. A content of the anode material in the anode 4 may be 60 to 100 wt %.

In S103, in the operation of preparing and providing the sulfur dioxide-based inorganic liquid electrolyte 1, sulfur dioxide ($SO_2$) and sodium salt ($NaAlCl_4$) are prepared. Here, as the sodium salt, $NaAlCl_4$, $NaGaCl_4$, $Na_2CuCl_4$, $Na_2MnCl_4$, $Na_2CoCl_4$, $Na_2NiCl_4$, $Na_2ZnCl_4$, $Na_2PdCl_4$, and the like may be used. In the sulfur dioxide-based inorganic liquid electrolyte 1, a molar ratio of $SO_2$ based on $NaAlCl_4$ is 0.5 to 10, and preferably, 1.5 to 3.0.

In S105, the sodium-metal chloride secondary battery may be manufactured by, for example, sequentially laminating the anode 4, the sulfur dioxide-based inorganic liquid electrolyte 1, and the cathode 3 in the case 5. In this process, the anode 4 and the cathode 3 are provided in the case 5 at a predetermined interval, the sulfur dioxide-based inorganic liquid electrolyte 1 is injected between the anode and the cathode, and then the case 5 is sealed to manufacture the battery.

The manufactured sodium-metal chloride secondary battery has a cross section having a shape of a circle, an ellipse, a long circle, a rectangle, a rectangle with rounded corners, and the like. Also, a shape of the battery may include, for example, a paper shape, a coin shape, a cylindrical shape, and an angular shape.

Figure 3:
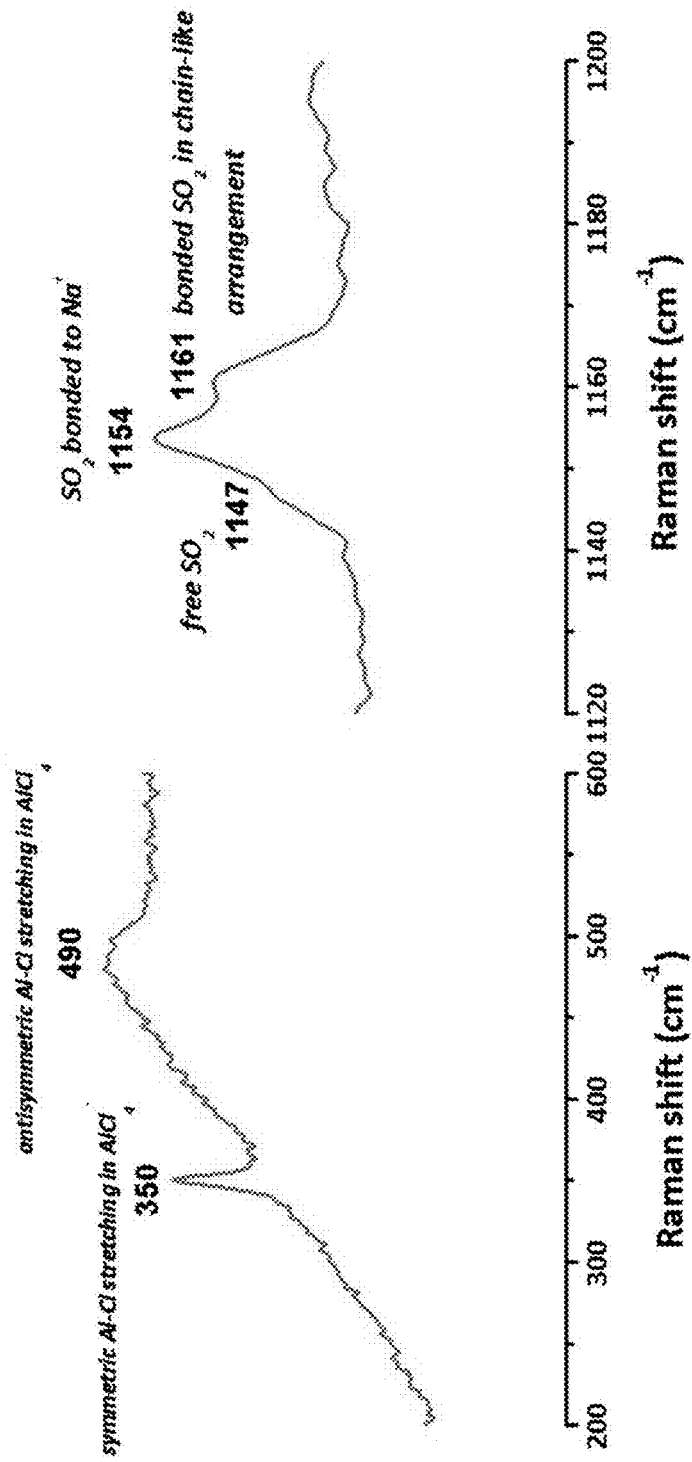
FIG. 3 is a diagram illustrating the results of Raman spectra analysis of a $NaAlCl_4$-$xSO_2$ electrolytic solution.
Figure 4:
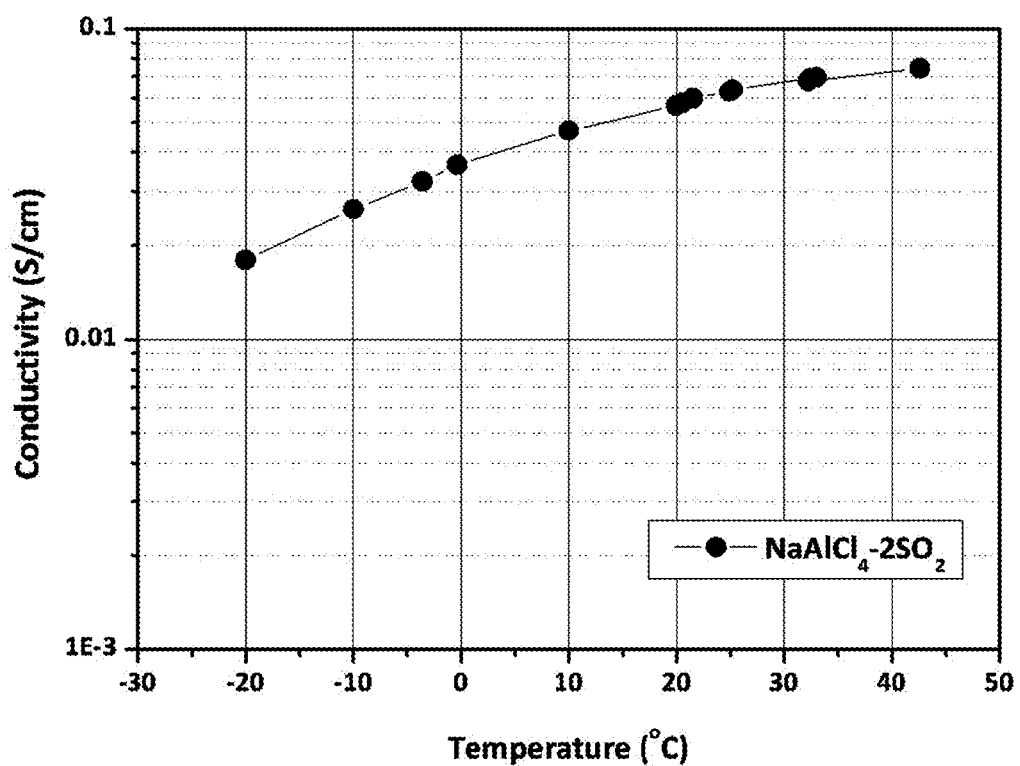
FIG. 4 is a diagram illustrating ion conductivity of a $NaAlCl_4$-$2SO_2$ electrolytic solution.

FIG. 3 is a diagram illustrating the results of Raman spectra analysis of $NaAlC_{14}$-$xSO_2$ electrolytes. FIG. 4 is a diagram illustrating an ion conductivity characteristic of $NaAlC_{14}$-$xSO_2$. The $NaAlC_{14}$-$xSO_2$ electrolyte may be prepared by inputting sulfur dioxide ($SO_2$) gas to a mixture of NaCl and $AlCl_3$ (or a salt of $NaAlCl_4$ alone).

As illustrated in FIGS. 3 and 4, the $NaAlCl_4$-$2SO_2$ electrolytic solution obtained by the above method shows a high sodium ion conductivity characteristic, closer to 0.1 S/cm, and maintains a liquid state showing a relatively high conductivity at low temperatures.

Figure 5:
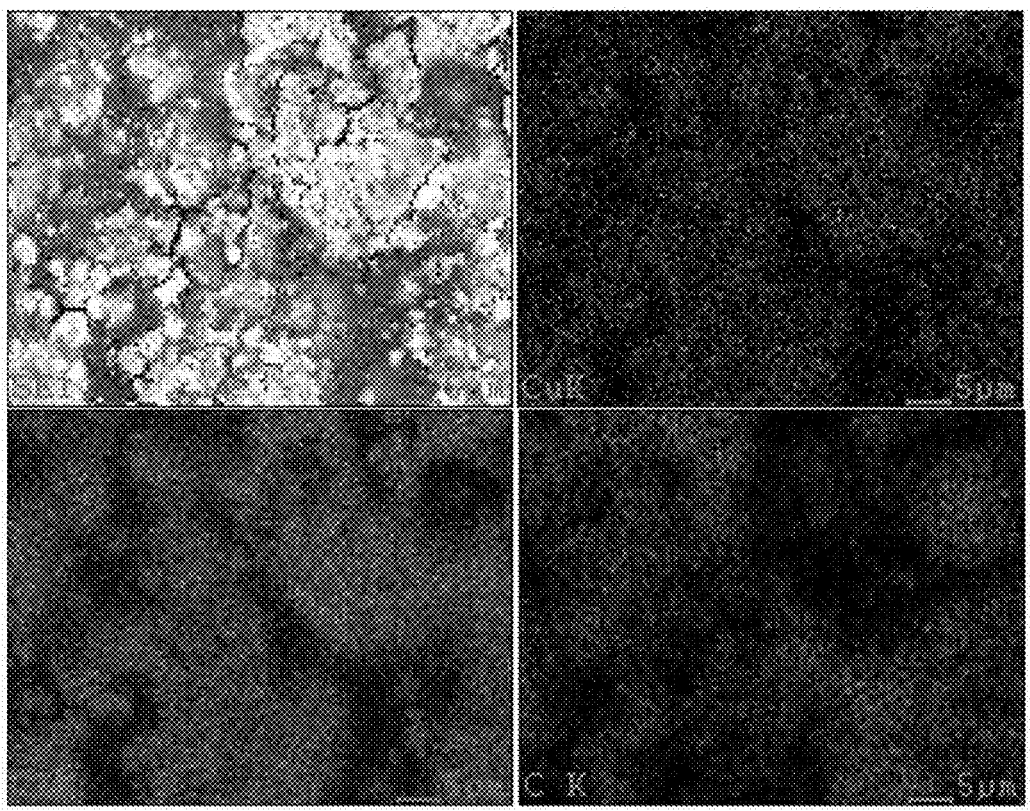
FIG. 5 shows a scanning electron microscope picture of a $CuCl_2$ cathode.

FIG. 5 shows a scanning electron microscope picture of a representative $CuCl_2$ cathode of a metal chloride anode material.

As shown in FIG. 5, the metal chloride cathode 3 includes porous carbon and $CuCl_2$. When charge and discharge are performed on $CuCl_2$, an oxidation number of Cu is changed, a reaction with sodium ions is performed, and discharge products of Cu and NaCl are obtained. When charge is performed, $CuCl_2$ is reversibly regenerated. A content of the metal chloride 2 in the cathode 3 is 50 to 100 wt %, and preferably, 70 to 95 wt %.

Figure 6:
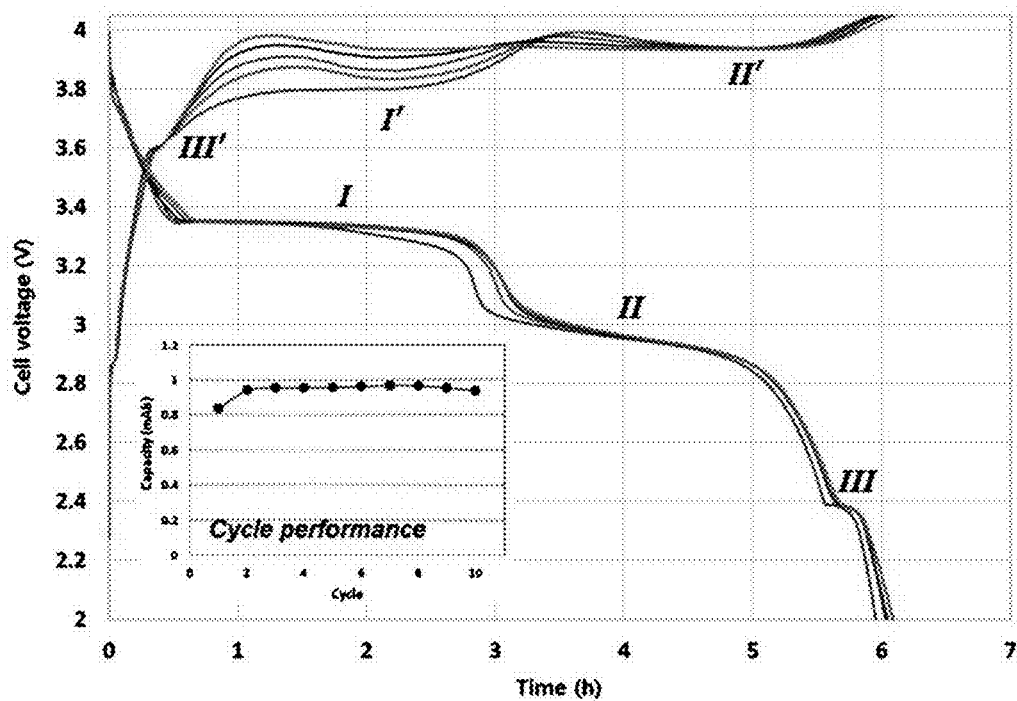
FIG. 6 is a diagram illustrating charge-discharge characteristics of a Na—$CuCl_2$ battery.

FIG. 6 is a diagram illustrating a charge and discharge curve and a lifespan characteristic of a Na-metal chloride battery according to an embodiment of the present invention. Here, as described above, the used anode 4 uses a sodium metal, a sodium-containing alloy, an intermetallic compound, and an inorganic material. The inorganic material includes carbon, an oxide, a sulfide, a phosphide, a nitride, a fluoride, and the like.

As illustrated in FIG. 6, battery performance of a representative Na-metal chloride battery including the $NaAlC_{14}$-$2SO_2$ electrolytic solution, the $CuCl_2$ cathode 3, and the sodium metal anode 4 shows an excellent battery capacity and operating voltage. Regions I and I' indicate an oxidation-reduction reaction region between $CuCl_2$ and CuCl, regions II and II' indicate an oxidation-reduction reaction region of $SO_2$ and conductive carbon, and regions III and III' indicates an oxidation-reduction reaction region between CuCl and Cu. The battery shows a high discharge voltage of 3V or more and an excellent lifespan characteristic.

According to the method of manufacturing a sodium-metal chloride secondary battery of the present invention and the sodium-metal chloride secondary battery manufactured by the method, the sodium-metal chloride secondary battery of the present invention may provide a new high energy/power density characteristic, be operated at room temperature, provide increased safety, and ensure price competitiveness.

The embodiments disclosed in this specification and drawings are only examples to help understanding of the invention and the invention is not limited thereto. It is apparent to those skilled in the art that various modifications based on the technological scope of the invention in addition to the embodiments disclosed herein can be made.

What is claimed is:

1. A method of manufacturing a sodium-metal chloride secondary battery, comprising:
   preparing a cathode comprising a carbon-based material and a metal chloride;
   preparing an anode made of an inorganic material containing sodium; and
   providing an inorganic liquid electrolyte containing sulfur dioxide ($SO_2$) and sodium salt ($NaAlCl_4$) between the cathode and the anode,
   wherein the carbon-based material comprises at least one other element selected from the group of nitrogen (N), oxygen (O), boron (B), fluorine (F), phosphorus (P), sulfur (S), and silicon (Si), and
   wherein the atomic percent (at %) of the at least one other element in the carbon-based material is 5 at % to 15 at %.

2. The method of claim 1,
   wherein, in the inorganic liquid electrolyte, a molar ratio of $SO_2$ based on the sodium salt is 1.5 to 3.0.

3. The method of claim 1,
   wherein the metal chloride comprises at least one selected from the group of $CuCl_2$, $CuCl$, $NiCl_2$, $FeCl_2$, $FeCl_3$, $CoCl_2$, $MnCl_2$, $CrCl_2$, $CrCl_3$, $VCl_2$, $VCl_3$, $ZnCl_2$, $ZnCl_4$, $NbCl_5$, $MoCl_3$, $MoCl_5$, $RuCl_3$, $RhCl_3$, $PdCl_2$, $AgCl$, and $CdCl_2$.

4. The method of claim 3,
   wherein a content of metal chloride in the cathode is 60 wt % to 99 wt %.

5. The method of claim 1,
   wherein the inorganic material contains one selected from the group of a sodium metal, a sodium-containing alloy, a sodium-containing intermetallic compound, and a sodium-containing carbon material, and
   wherein the inorganic material comprises at least one selected from the group of an oxide, a sulfide, a phosphide, a nitride, and a fluoride.

6. A sodium-metal chloride secondary battery, comprising:
   an anode made of an inorganic material containing sodium;
   a cathode comprising a carbon-based material and metal chloride,
   an electrolytic solution containing an electrolyte ($NaAlCl_4$) and a solvent (sulfur dioxide), interposed between the anode and cathode,
   wherein NaCl is generated and decomposed according to an oxidation-reduction reaction of $NaAlCl_4$-$xSO_2$ on the cathode,
   wherein the carbon-based material comprises at least one other element selected from the group of nitrogen (N), oxygen (O), boron (B), fluorine (F), phosphorus (P), sulfur (S), and silicon (Si), and
   wherein the atomic percent (at %) of the at least one other element in the carbon-based material is 5 at % to 15 at %.

7. The sodium-metal chloride secondary battery of claim 6, wherein, in the inorganic liquid electrolyte, a molar ratio of $SO_2$ based on the sodium salt is 1.5 to 3.0.

8. The sodium-metal chloride secondary battery of claim 6,
   wherein the metal chloride comprises at least one selected from the group of $CuCl_2$, $CuCl$, $NiCl_2$, $FeCl_2$, $FeCl_3$, $CoCl_2$, $MnCl_2$, $CrCl_2$, $CrCl_3$, $VCl_2$, $VCl_3$, $ZnCl_2$, $ZnCl_4$, $NbCl_5$, $MoCl_3$, $MoCl_5$, $RuCl_3$, $RhCl_3$, $PdCl_2$, $AgCl$, and $CdCl_2$.

9. The sodium-metal chloride secondary battery of claim 8, wherein a content of metal chloride in the cathode is 60 wt % to 99 wt %.

10. The sodium-metal chloride secondary battery of claim 6,
    wherein the inorganic material contains one selected from the group of a sodium metal, a sodium-containing alloy, a sodium-containing intermetallic compound, and a sodium-containing carbon material, and
    wherein the inorganic material comprises at least one selected from the group of an oxide, a sulfide, a phosphide, a nitride, and a fluoride.

11. The sodium-metal chloride secondary battery of claim 6,
    wherein the carbon-based material is a porous carbon-based material.

12. The method of claim 1, wherein the carbon-based material is a porous carbon-based material.

* * * * *